United States Patent
Lioy et al.

(12) 
(10) Patent No.: US 6,424,639 B1
(45) Date of Patent: Jul. 23, 2002

(54) NOTIFYING A MOBILE TERMINAL DEVICE OF A CHANGE IN POINT OF ATTACHMENT TO AN IP INTERNETWORK TO FACILITATE MOBILITY

(75) Inventors: Marcello Lioy; Nischal Abrol, both of San Diego, CA (US)

(73) Assignee: Qualcomm, Incorporated, San Diego, CA (US)

(*) Notice: Subject to any disclaimer, the term of this patent is extended or adjusted under 35 U.S.C. 154(b) by 0 days.

(21) Appl. No.: 09/470,223

(22) Filed: Dec. 22, 1999

(51) Int. Cl.[7] ............................................. H04Q 7/24
(52) U.S. Cl. .................... 370/338; 370/331; 370/469; 455/440
(58) Field of Search ................................ 370/328, 329, 370/331, 338, 352, 389, 392, 465, 469; 455/422, 436, 439, 440

(56) References Cited

U.S. PATENT DOCUMENTS

| | | | |
|---|---|---|---|
| 5,440,542 A | * 8/1995 | Procter et al. | 370/335 |
| 5,873,035 A | 2/1999 | Ladden et al. | |
| 5,896,369 A | * 4/1999 | Warsta et al. | 370/338 |
| 5,978,386 A | * 11/1999 | Hamalainen et al. | 370/466 |
| 6,052,369 A | * 4/2000 | Hamalainen et al. | 370/389 |
| 6,167,248 A | * 12/2000 | Hamalainen et al. | 455/403 |
| 6,243,581 B1 | * 6/2001 | Jawanda | 455/432 |

FOREIGN PATENT DOCUMENTS

| | | | |
|---|---|---|---|
| WO | 9962223 | 12/1999 | H04L/12/00 |

OTHER PUBLICATIONS

Valko, et al., "Cellular IP", Nov. 1998, pp. 1–19.

* cited by examiner

Primary Examiner—David Vincent
(74) Attorney, Agent, or Firm—Philip Wadsworth; Charles D. Brown; George C. Pappas (57) ABSTRACT

A mobile packet network call is established over a transmission link, extending between a mobile terminal device and a given interworking function. The transmission link connects the mobile terminal device to a wireless communication device over a first interface and further connects the wireless communication device to the given interworking function over a second interface via a wireless link to a base station. The transmission link further comprises a packet mode in which the traffic channel is up and a dormant mode in which the traffic channel is down while the data link layer link and the network layer link are maintained. Network region identifier information is provided to the wireless communication device. The wireless communication device determines when the given interworking function has changed from a first interworking function to a second interworking function by determining when there is a corresponding change in the network region identifier information. The wireless communication device initiates a link control protocol renegotiation with the mobile terminal device when the corresponding change in the network region identifier information has been determined. The mobile terminal device responds to the initiation of the link control protocol, and causes the transmission link to enter the packet mode, and to bring up the traffic channel. The data link layer link is then established with the second interworking function. The mobile terminal device and the second interworking function then negotiate network control protocol options and establish a network layer link. If the second interworking function corresponds to a new foreign agent, the mobile terminal device will then update its IP mobility registration.

8 Claims, 5 Drawing Sheets

NOTIFYING A MOBILE TERMINAL DEVICE OF A CHANGE IN POINT OF ATTACHMENT TO AN IP INTERNETWORK TO FACILITATE MOBILITY

BACKGROUND OF THE INVENTION

1. Field of the Invention

The present invention relates to methods and systems related to notifying a mobile terminal device when an interworking function to which it is connected by a wireless link changes to a new interworking function.

2. Description of Background Information

Mobile computing generally involves the use of mobile terminal devices such as notebook computers connected to a computer network (e.g., the Internet) via a wireless communication device (e.g., a mobile phone). "Mobile IP" is a functionality in wireless communications where mobile terminal devices connected to the Internet may send and receive packets addressed with their home network IP (Internet Protocol) address (a static IP address) while their current point of attachment to the Internet (i.e., their current interworking function) changes. This allows the mobile terminal device to maintain its connection with another entity through a packet-based link, and facilitates two-way communication over that link.

Figure 1:
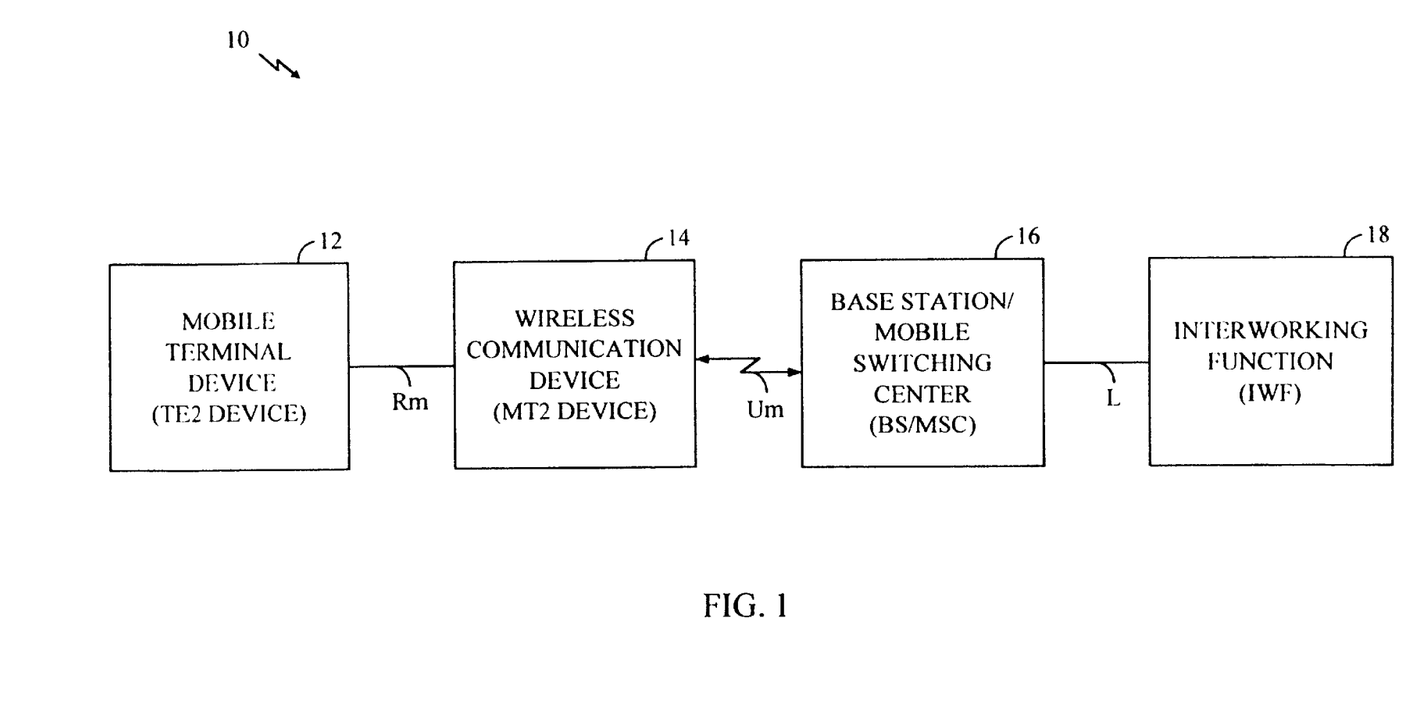
FIG. 1 is a block diagram of a mobile computing communications subsystem.

FIG. 1 is a block diagram of a simplified network reference model applicable to mobile computing data services, including mobile IP support. The model shows select network entities forming a communications subsystem 10. A mobile terminal device 12 is coupled to a wireless communication device 14, which is in turn connected to a base station/mobile switching center 16 via a wireless interface. The base station/mobile switching center 16 is connected to an interworking function 18. The simplified network reference model is described in the document entitled "Data Service Options for Wideband Spread Spectrum Systems," TIA/EIA/IS-707, Published Version (February, 1998), the content of which is hereby expressly incorporated by reference herein in its entirety (herein referred to as "IS-707").

According to IS-707, mobile terminal device 12, communication device 14, base station/mobile switching center 16, and interworking function 18 are respectively referred to as a TE2 device, an MT2 device, a BS/MSC and an IWF. The interface between mobile terminal device 12 and the wireless communication device 14 is called a Rm interface. The interface between wireless communication device 14 and base station/mobile switching center 16 is referred to as an Um interface. The interface between base station/mobile switching center 16 and interworking function 18 is referred to as an L interface.

Mobile terminal device 12 may comprise, for example, a notebook computer, a personal digital assistant, or any other computing device capable of computer network communications, including packet-based communications or communications via a dial-up modem. Wireless communication device 14 may comprise, for example, a wireless terminal used by subscribers to access the network services over a radio link. The wireless terminal may comprise a hand-held cellular telephone, or a unit installed in a vehicle. Wireless communication device 14 may,also be fixed to a particular location.

Base station/mobile switching center 16 is shown in FIG. 1 as a single functional entity, although it need not be. The base station portion of the illustrated base station/mobile switching center allows wireless communication device 14 to access network services using a radio link or another type of wireless link. The mobile switching center portion handles the switching of traffic between the wireless link and a telecommunications network to which the wireless link is connected. The telecommunications network may comprise one or a combination of public switched telephone: network (PSTN), integrated services digital network (ISDN), internet routers, and other network types and entities.

Interworking function 18 represents the point at which a gateway or bridge connection is formed between mobile terminal device 12 and/or wireless communication device 14 at one end and the Internet at the other end.

Figure 2:
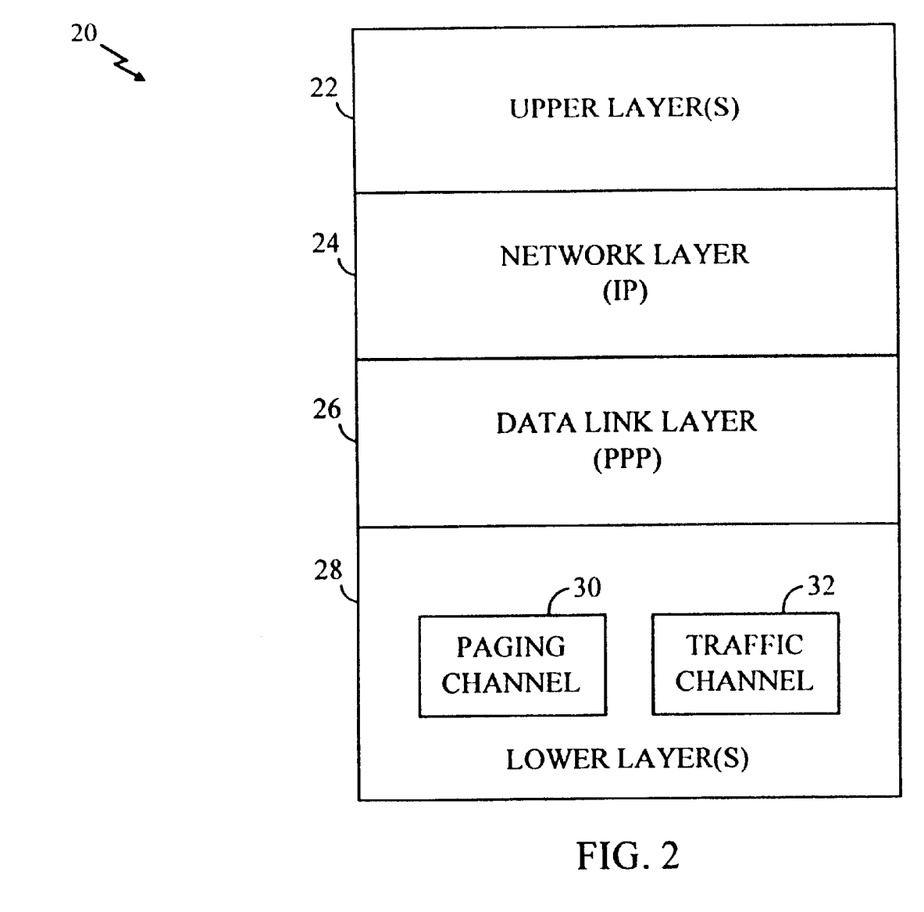
FIG. 2 is a simplified diagram of a protocol stack structure.

FIG. 2 is a simplified diagram of a protocol stack adhered to by many mobile computing environments, including those adhering to IS-707. The stack comprises one or more lower layer(s) 28, a data link layer 26, a network layer 24, and one or more upper layers 22. One or more lower layers 28 are provided. These lower layers include, among other things, connections establishing a physical link, and may also include a relay layer as disclosed in IS-707, a paging channel 30, and a traffic channel 32.

Data link layer 26 is immediately above lower layer(s) 28. Data link layer 26 may utilize such protocols as PPP and/or SLIP. This layer deals with point-to-point communication between two computers. It packages addressing data, and manages the flow of transmissions. PPP is described, for example, in RFC 1661, "The Point-to-Point Protocol," (July 1994), the content of which is hereby expressly incorporated by reference herein in its entirety. PPP facilitates the transmission of datagrams between data communications equipment from different manufactures over a dial-up and dedicated serial point-to-point links. PPP can simultaneously transmit multiple protocols across a single serial link, without the need to set up a separate link for each protocol. PPP also allows the interconnection of dissimilar devices, such as host bridges and routers, over serial links. The PPP protocol is comprised of three main components, including an encapsulation scheme, the link control protocol, and network control protocols. These components are respectively responsible for creating the frame, controlling the link, and managing the network layer protocol.

Network layer 24 is just above data link layer 26, and may comprise such protocols as IP or connectionless network protocol (CLNP). The network layer ensures that information arrives at its intended destination. That is, it is concerned with the actual movement of information from one network entity to another. The internet protocol (IP) breaks up data messages into packets, routes the packets from a sender to a destination network entity, and reassembles the packets into the original data messages at the destination. The IP protocol contains an IP header which contains source and destination address fields that uniquely identify host computers respectively acting as the source and destination of the packets being transferred.

Upper layer(s) portion 22 comprises one or more protocol layers above network layer 24, including, for example, the TCP (transmission control protocol) that facilitates the reliable in-order delivery of an input data stream.

Various protocol techniques are specified to achieve IP mobility support in RFC 2002, "IP Mobility Support," (October, 1996) (hereinafter referred to as "RFC 2002"), the content of which is hereby expressly incorporated by reference herein in its entirety. As described in RFC 2002, IP mobility support allows a mobile node to communicate with other nodes after changing its link layer point of attachment to the Internet, yet without changing its IP address. The mobile node will ideally be able to communicate with other nodes that do not implement these mobility functions, and there should be no need for protocol enhancements in hosts, routers, or bridges that are involved in the routing of packets to and from the given mobile node that supports IP mobility.

"Agent discovery" is a method disclosed by RFC 2002 by which a mobile node will determine whether it is currently connected to the Internet via its home network or via a foreign network, and when it is connected through a foreign network, the mobile node detects when it has moved from one foreign network to another. Agent discovery involves both agent advertisements and agent solicitations which can be sent and received by mobile nodes, foreign agents, and home agents. Network entities called "Mobility Agents" send agent advertisements which are received by the mobile node and which indicate when a given foreign network changes. These agent advertisements are sent over traffic channel 32 to the mobile node which, in the network model shown in FIG. 1, comprises mobile terminal device 12. However, there are circumstances in which it is desired that a link be maintained between the mobile node (i.e., mobile terminal device 12) and the point of attachment (i.e., interworking function 18) even though traffic channel 32 is down. For example, IS 707.5 sets forth a dormant mode for packet data services, in which the traffic channel is down while the PPP link (within data link layer 26) and the IP link (within network layer 24) extending between the mobile terminal device 12 and interworking function 18 are maintained. Under these circumstances, a mobile terminal device 12 will not receive the agent advertisements alerting it when there is a change in its location from a first geographic region to a second geographic region, requiring that the link be switched to a new/second interworking function.

There is a need for a mechanism to allow mobile terminal device 12 to be timely notified of a change in its interworking function 18, which will occur as a result of wireless communication device 14 moving from a first geographic region to a second geographic region.

3. Definitions of Terms and Acronyms

The following term and acronym definitions are provided to assist the reader in obtaining an understanding of the invention as described herein.

Flow control: An act performed by a receiving entity to limit the amount or rate of data sent to it by a transmitting entity.

Interworking Function (IWF): A point at which a gateway or bridge connection is formed between a given network (e.g., a packet network) and mobile devices coupled to the network by way of a base station and/or a mobile switching center.

SUMMARY OF THE INVENTION

In view of the above, the present invention, through one or more of its various aspects and/or embodiments, is thus presented to bring about one or more objects and advantages. One such object is to provide mechanisms and protocols which allow a mobile terminal device to become aware of a change in its point of attachment to a packet network to which it is connected. A further object of the present invention is to provide a mechanism by which the wireless communication device can notify the mobile terminal device of the change in the point of attachment so the mobile terminal device can update its registration of its IP address and continue to enjoy the benefit of IP mobility.

The present invention, therefore, is directed to a system or a method including a mechanism for updating a transmission link over which a mobile packet network call is established when the wireless communication device moves, requiring a change in a given interworking function. The transmission link extends between a mobile terminal device and a given interworking function, and connects the mobile terminal device to a wireless communication device over a first interface. The transmission link further connects the wireless communication device to the given interworking function over a second interface via a wireless link to a base station. The given interworking function changes from a first interworking function associated with a first geographic region to a second interworking function associated with a second geographic region when the wireless communication device moves from the first geographic region to the second geographic region. The transmission link comprises, among other elements, a traffic channel, a data link layer link, and a network layer link. The transmission link comprises a packet mode in which the traffic channel is up and a dormant mode in which the traffic channel is down while the data link layer link and the network layer link are maintained. Network region identifier information is provided to the wireless communication device when the transmission link is in the dormant mode (and also when the traffic channel is up). The wireless communication device determines when the given interworking function has changed from the first interworking function to the second interworking function by determining when there is a corresponding change in the network region identifier information.

The wireless communication device initiates a link control protocol negotiation with the mobile terminal device when the change in the network region identifier information has been determined. The mobile terminal device responds to the initiation of the link control protocol negotiation by sending link control protocol packets to the second interworking function via the wireless communication device. The transmission link then enters the packet mode and brings up the traffic channel. The data link layer link is then established with the second interworking function. After the data link layer link with the second interworking function is established, the mobile terminal device and the second interworking function negotiate network control protocol options and establish a network layer link therebetween. When appropriate, the mobile terminal device updates its mobile IP registration.

BRIEF DESCRIPTION OF THE DRAWINGS

The present invention is further described in the detailed description which follows, by reference to the noted plurality of drawings by way of non-limiting examples of embodiments of the present invention, in which like reference numerals represent similar parts throughout the several views of the drawings, and wherein.

DETAILED DESCRIPTION OF THE EXEMPLARY EMBODIMENT

The present invention is directed to a mobile computing communications subsystem, or one or more parts thereof, for facilitating the support of IP mobility. A communications subsystem 10 as shown in FIG. 1 will form a transmission link which extends between mobile terminal device 12 and interworking function 18. A mobile packet network call is established over that transmission link. The transmission link connects mobile terminal device 12 to wireless communication device 14 over a first interface (Rm), and further connects wireless communication device 14 to interworking function 18 over a second interface (Um and L) via a wireless link to base station/mobile switching center 16.

Interworking function 18 may change to a new interworking function. For example, this may occur when a user travels, carrying his or her mobile terminal device (e.g., a laptop computer) and wireless communication device 14 (typically a cellular mobile telephone), the user and the equipment will move from one geographic region to another, which causes the need to change the point at which the mobile equipment is attached to the internet. That is, interworking function 18 will need to be changed. More specifically, if the user changes position so as to cause wireless communication device 14 to move from a first geographic region to a second geographic region, a given interworking function 18 will be changed from a first interworking function associated with the first geographic region to a second interworking function associated with the second geographic region.

Interworking function. 18 may serve as a foreign agent, thereby facilitating IP mobility. A foreign agent comprises a router on a network visited by the mobile node, which, in this case, comprises mobile terminal device 12. The static IP address representing the mobile node is registered as part of the mobile IP registration process as set forth, for example, in RFC 2002. That is, when the mobile node moves from one foreign network to another, it is given a new interworking function which corresponds to the new foreign network it is visiting. Therefore, mobile terminal device 12 needs to be notified of such a change in the foreign network it is visiting, so that it can, where appropriate or necessary, update its mobile IP registration. In this regard, if the change in interworking function 18 indicates that there is a new foreign agent being visited by mobile terminal device 12, its IP registration will be updated. If the same foreign agent is being used, there is no need for an update of the mobile IP registration.

Referring back to FIG. 2, lower layers 28 may comprise a paging channel 30 and a traffic channel 32. Paging channel 30 may carry general overhead messages sent by various network entities as well as paging messages. The information sent over paging channel 30 may comprise network region identifier information such as an SID/NID pair (as set forth in IS-95A) or a packet zone id (as set forth in IS-95B). While the illustrated embodiment uses a paging channel 30, other common channels like the BCCH used in CDMA 2000 may be used as well. Traffic channel 32 carries payload data information over the transmission link.

As shown, for example, in FIG. 2, a transmission link may comprise a traffic channel 32, a data link layer link provided within data link layer 26, and a network layer link provided within network layer 24. In the illustrated embodiment, the data link layer link comprises a PPP link, and the network layer link comprises an IP link. The transmission link may be configured to have a packet mode and a dormant mode. In the packet mode, traffic channel 32 is up, and payload data is allowed to flow through traffic channel 32. While the transmission link is in the dormant mode, traffic channel 32 is down, while data link layer link (PPP link) and the network layer link (the IP link) are maintained. By way of example, the transmission link can be configured as disclosed in IS-707. The illustrated embodiment is directed to a CDMA implementation, and conforms to the IS-707 standard. However, the illustrated embodiment is not meant to limit the present invention to CDMA and the other standards specifically noted herein, such as IS-707 and IS-95A or B. Rather, other technologies and standards may be used. For example, instead of the use of CDMA cellular technology, other cellular communication standards may be used such as TDMA, GSM, W-CDMA, or CDMA 2000 networks.

Figure 3:
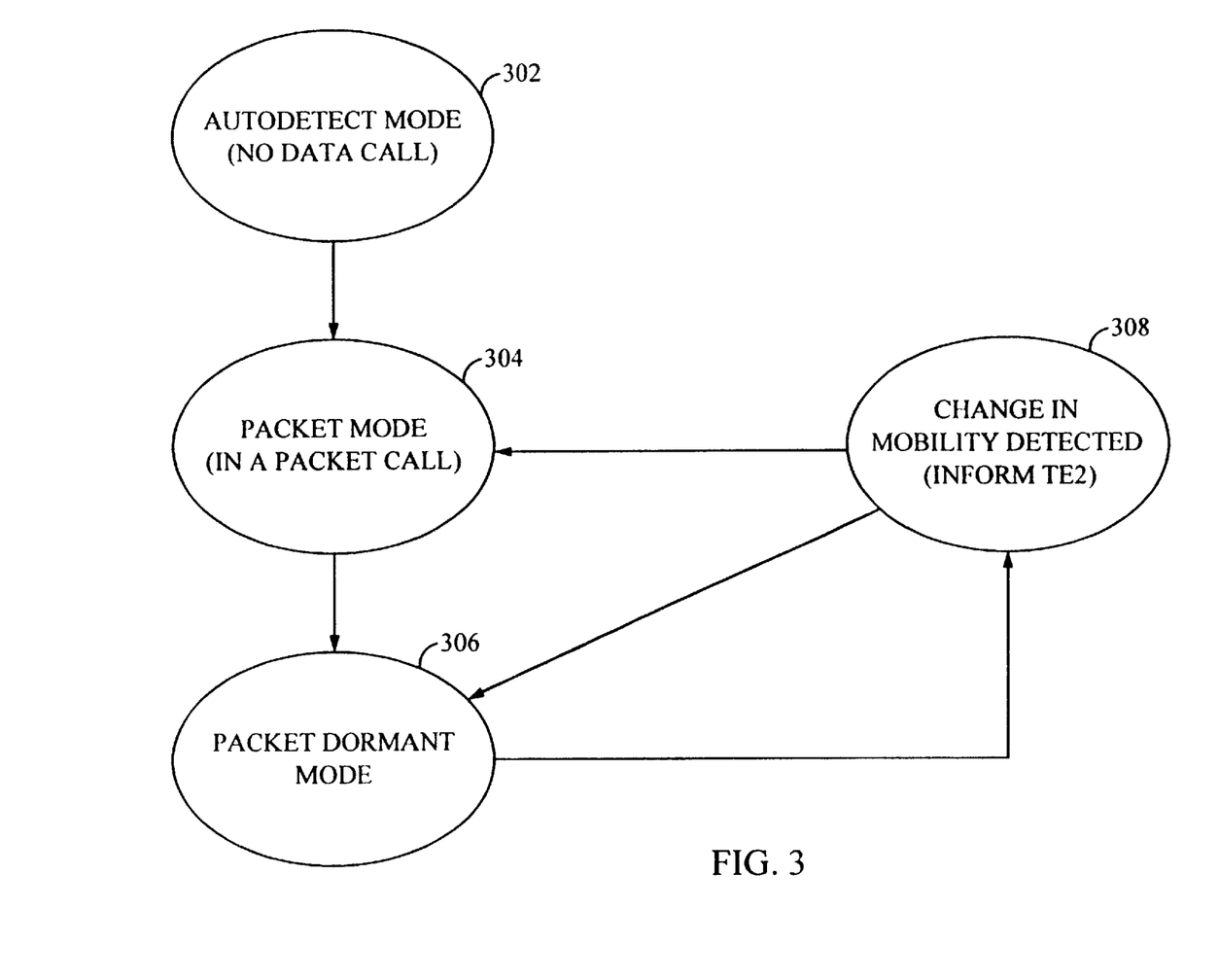
FIG. 3 is a state diagram representing various states of a mobile computing communications subsystem.

FIG. 3 is a state diagram showing the states of certain network elements forming part of communications subsystem 10 and the transitions between such states. When communication subsystem 10 is in an autodetect mode 302, a call is established over the transmission link extending between wireless communication device 14 and at least base station/mobile switching center 16, but no data is transmitted. This mode corresponds to the Dormant/Traffic State as disclosed in IS-707.5, in which the mobile. station is communicating with the BS/MSC on a traffic channel, but the packet data service option has been disconnected, so that the mobile station cannot transfer packet data. Communication subsystem 10 may move from the autodetect mode 302 into a packet mode 304, in which the mobile station is in a packet call. This state corresponds to the Connected State, as disclosed in IS-707.5. In this state, a packet data service option is connected, and the mobile station can transfer packet data. The mobile communication subsystem 10 may move from the packet mode 304 into the packet dormant mode 306. The packet dormant mode 306 corresponds to the Dormant/Idle State as disclosed in IS-707.5, in which the mobile station is not on a traffic channel, i.e., the traffic channel is down, and the mobile station cannot transfer packet data. However, the PPP and IP links are maintained. Mobile communication subsystem 10 moves from autodetect mode 302 to packet mode 304 when a PPP packet sent by mobile terminal device 12 is detected by wireless communication device 14. Mobile communication subsystem 10 may move from a packet mode 304 into packet dormant mode 306, for example, when a dormant timer provided within wireless communication device 14 expires (In CDMA 2000, such a timer is maintained at the BSC/MSC and the mobile is told by a signaling message when to go to the dormant mode.). When wireless communication device 14 is in packet dormant mode 306, and wireless communication device 14 determines that the given interworking function 18 has changed from a first interworking function to a second interworking function, wireless communication device 14 will change from a packet dormant mode 306 into a change in mobility detected state 308, at which time wireless communication device 14 will take steps to inform mobile terminal device 12 of the change. At this time, wireless communication device 14 will notify mobile terminal device 12 of the change in the interworking function 18. If mobile terminal device 12 responds to the communication of the interworking function change, mobile communications subsystem 10 will reenter packet mode 304, since mobile terminal device 12 will at that point cause the transmission link to enter packet mode 304 and bring up the traffic channel, and will further initiate the reestablishment of a data link layer link (a PPP) link with the new interworking function 18. If mobile terminal device 12 does not respond to the change communication it receives from wireless communication device 14, the state will transition from change in mobility detected state 308 to packet dormant mode 306.

Figure 4:
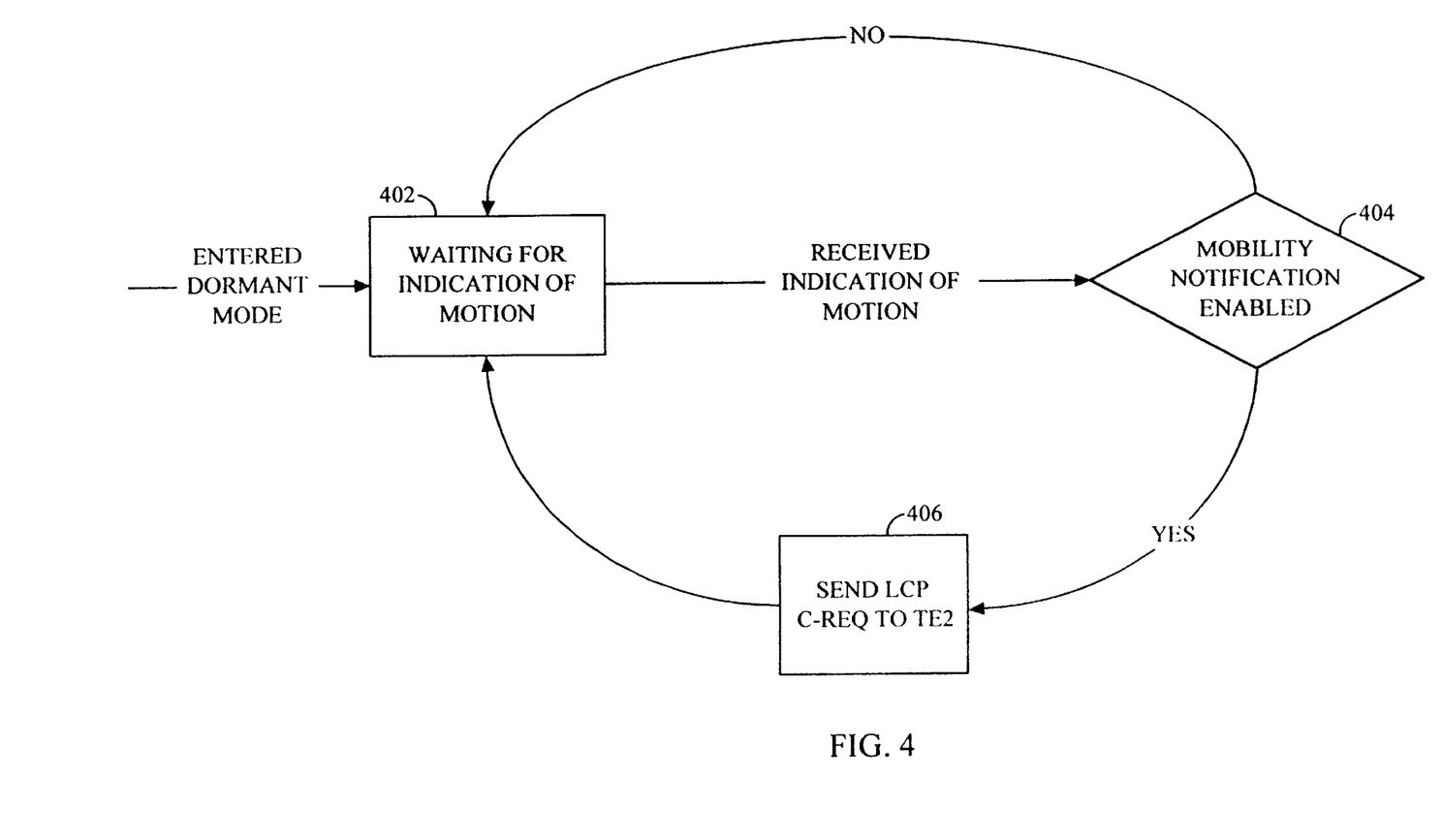
FIG. 4 is a flow diagram representing a set of process steps performed by a mobile communication device in accordance with the illustrated embodiment.

FIG. 4 is a flowchart of a process performed by wireless communication device 14 when the transmission link is in a packet dormant mode. The process starts with an act 402 in which it waits for an indication that the given interworking function 18 has changed from a first interworking function to a second interworking function. The first and second interworking functions may have the same or overlapping geographic regions or they may be associated with different geographic regions, i.e., a first geographic region and a second geographic region, respectively. More specifically, wireless communication device 14 determines when the given interworking function 18 has changed from one interworking function to a new interworking function by determining when there is a corresponding change in network region identifier information provided to it over the transmission link when the transmission link is in the dormant mode. The network region identifier information may comprise information transmitted over paging channel 30 within the lower layers of the protocol stack being used to effect the transmission link. More specifically, the network region identifier may comprise, for example, a packet zone id (in accordance with IS-95B) or a SID/NID pair (in accordance with IS-95A). When wireless communication device 14 receives an indication that the interworking function has changed due to a relocation of wireless communication device 14 to a new geographic region, its processing will perform act 404 at which time wireless communication device 14 will make a determination as to whether wireless communication device 14 has been configured to support mobility notification.

If mobility notification is enabled, the process will proceed to act 406, at which time wireless communication device 14 will notify mobile terminal device 12 of the relocation of wireless communication device 14 so as to cause a change in interworking function 18 to a new interworking function. Specifically, act 406 comprises the act of sending, a link control protocol (LCP) Configuration Request to mobile terminal device 12. Mobile terminal device 12 does not expect to receive an LCP packet directly from wireless communication device 14, and will accordingly interpret its receipt of the LCP Configuration Request as being sent directly from the interworking function. This communication causes mobile terminal device 12 to resynchronize its instance of the PPP link between mobile terminal device 12 and the new interworking function 18. Mobile terminal device 12 will start this by sending its own LCP packets to interworking function 18, which causes the traffic channel to be brought up and the wireless communication device 14 to be brought back into the packet mode 304 (FIG. 3).

After the act of sending the LCP Configuration Request to mobile terminal device 12 (and the PPP resyncing resulting therefrom), the process will return to act 402, where it will await an indication of a change in the interworking function, provided the transmission link is still in the packet dormant mode 306. The reestablishment of the PPP link between mobile terminal device 12 and new interworking function 18 allows the new interworking function 18 to maintain a MIN (Mobile Identification Number)-IP address mapping to facilitate communication between wireless communication device 14 and mobile terminal device 12 at one end and the internetwork at the other end. Accordingly, any in-bound packets coming in from the internetwork can be directed to mobile terminal device 12.

Figure 5:
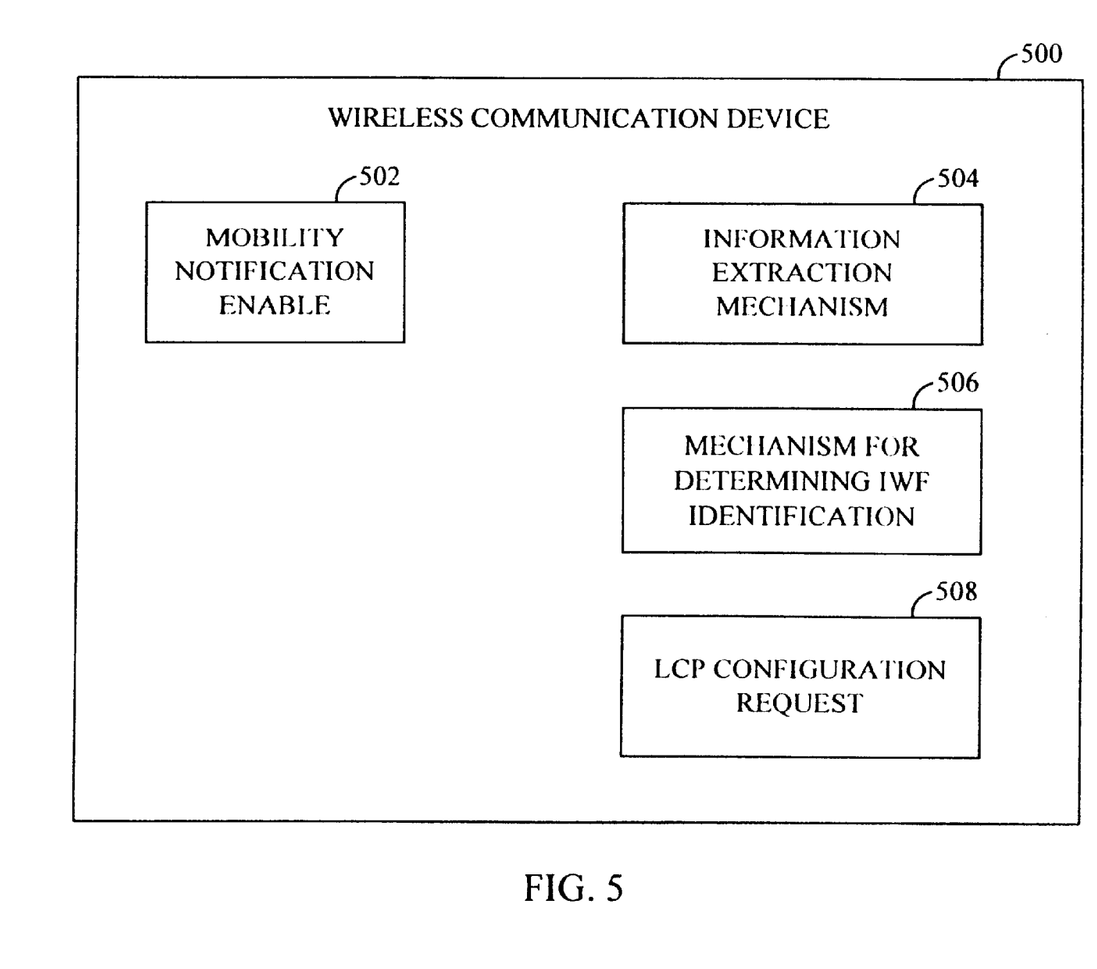
FIG. 5 is a simplified block diagram of a wireless communication device in the illustrated embodiment.

FIG. 5 provides a simplified block diagram of a wireless communication device 500, which comprises, among other elements not specifically shown, a mobility notification enable mechanism 502, an information extraction mechanism 504, a mechanism for determining an interworking function identification 506, and an LCP Configuration Request mechanism 508. Mobility notification enable mechanism 502 comprises a mechanism for allowing a wireless communication device 500 to be configured so that it is either enabled or not enabled for mobility notification. To determine if it is enabled, mobility notification enable mechanism 502 can be consulted, for example, at act 404 as shown in FIG. 4. By way of example, mobility notification enable mechanism 502 may comprise a location in memory, for example, a programmable read only memory, which can be provided with stored data indicating that the mobility notification is either enabled or not enabled.

Information extraction mechanism 504 comprise a mechanism for extracting information being transmitted over the transmission link, including the network region identifier information. In the illustrated embodiment, the network region identifier is transmitted over paging channel 30 in the lower layers of the protocol stack 20, as shown in FIG. 2. Information extraction mechanism 504 will extract the network region identifier information from paging channel 30, so that information can be used to determine whether there has been a change in the interworking function, which determination is performed by the mechanism for determining the interworking function identification 506. LCP Configuration Request mechanism 508 causes the sending of an LCP Configuration Request to mobile terminal device 12.

The functional block depictions shown in FIG. 5 may be implemented in a variety of different manners as known in the art. For example, the illustrated mechanisms may be implemented in the form of hardware (e.g., an application-specific integrated circuit), software (including a RAM-stored computer program, or a ROM-stored program—i.e., firmware, or a hybrid combination of software and firmware), or a hybrid combination of hardware and software.

Once the transmission link is put into the packet mode 304, after a determination that there has been a change in interworking function 18, as a result of the performance of act 406 in FIG. 4, an internet protocol control protocol (IPCP) negotiation is performed between mobile terminal device 12 and interworking function 18, during which time a determination is made as to whether the new interworking function 18 comprises a new foreign agent. If the new interworking function 18 comprises a new foreign agent, mobile terminal device 12 will update its mobile IP registration, using known methods, for example, as disclosed in RFC 2002.

While the invention has been described with reference to several illustrated embodiments, it is understood that the words which have been used herein are words of description, rather than words of limitation. Changes can be made, within the purview of the appended claims, without departing from the scope and spirit of the invention. Although the invention has been described herein with reference to particular materials, structures, and embodiments, it is understood that the invention is not to be limited to the particulars disclosed, but rather extends to all appropriate equivalent structures, methods, and uses.

What is claimed is:

1. A method comprising:
    establishing a mobile packet network call over a transmission link, said transmission link extending between a mobile terminal device and a given interworking function and connecting said mobile terminal device to a wireless communication device over a first interface and further connecting said wireless communication device to said given interworking function over a second interface via a wireless link to a base station, said given interworking function changing from a first interworking function to a second interworking function, said transmission link comprising a traffic channel, a data link layer link, and a network layer link, said transmission link comprising a packet mode in which said traffic channel is up and a dormant mode in which said traffic channel is down while said data link layer link and said network layer link are maintained;

providing to said wireless communication device network region identifier information when said transmission link is in said dormant mode;

said wireless communication device determining when said given interworking function has changed from said first interworking function to said second interworking function by determining when there is a corresponding change in network region identifier information;

said wireless communication device initiating a link control protocol negotiation with said mobile terminal device when said corresponding change in said network region identifier information has been determined;

said mobile terminal device responding to said initiation of said link control protocol negotiation by forwarding link control protocol packets to said second interworking function via said wireless communication device, causing said transmission link to enter said packet mode and to bring up said traffic channel, said mobile terminal device then establishing a data link layer link with said second interworking function;

after said data link layer link with said second interworking function is established, said mobile terminal device and said second interworking function negotiating network control protocol options and establishing a network layer link between said mobile terminal device and said second interworking function.

2. The method according to claim 1, wherein after said data link layer link with said second interworking function is established, said mobile terminal device, when appropriate, updating its IP mobility registration in accordance with said second interworking function.

3. The method according to claim 1, wherein said data link layer link and said network layer link respectively comprise a PPP link and an IP link.

4. The method according to claim 1, wherein said packet mode comprises a Connected State pursuant to IS-707.5, and wherein said dormant mode comprises a Dormant/Idle State pursuant to IS-707.5.

5. The method according to claim 1, wherein said network region identifier information comprises information transmitted over a paging channel of said transmission link.

6. The method according to claim 5, wherein said network region identifier information comprises one of a packet zone id and a system id/network id (SID/NID) pair.

7. The method according to claim 1, wherein said initiating a link control protocol negotiation with said mobile terminal device comprises sending a link control protocol (LCP) Configuration Request packet to said mobile terminal device, wherein said mobile terminal device interprets said LCP Configuration Request packet as originating from said second interworking function.

8. The method according to claim 7, wherein said mobile terminal device determines whether said second interworking function comprises a new foreign agent, and when said second interworking function comprises a new foreign agent, said mobile terminal device performs an IP mobility registration update process.

* * * * *